(12) United States Patent
Goetz et al.

(10) Patent No.: US 11,525,420 B2
(45) Date of Patent: Dec. 13, 2022

(54) COMBUSTION CHAMBER STRUCTURE, PARTICULARLY FOR A ROCKET ENGINE

(71) Applicant: ArianeGroup GmbH, Taufkirchen (DE)

(72) Inventors: Andreas Goetz, Vaterstetten (DE); Marc Geyer, Munich (DE); Torben Birck, Taufkirchen (DE); Olivier De Bonn, Ottobrunn (DE)

(73) Assignee: ArianeGroup GmbH, Taufkirchen (DE)

(*) Notice: Subject to any disclaimer, the term of this patent is extended or adjusted under 35 U.S.C. 154(b) by 0 days.

(21) Appl. No.: 16/512,889

(22) Filed: Jul. 16, 2019

(65) Prior Publication Data
US 2020/0088138 A1   Mar. 19, 2020

(30) Foreign Application Priority Data
Jul. 17, 2018 (EP) .................................... 18183912

(51) Int. Cl.
*F02K 9/64* (2006.01)
*F02K 9/97* (2006.01)

(52) U.S. Cl.
CPC ................ *F02K 9/64* (2013.01); *F02K 9/972* (2013.01)

(58) Field of Classification Search
CPC ................................. F02K 9/64; F02K 9/972
See application file for complete search history.

(56) References Cited

U.S. PATENT DOCUMENTS 2,526,222 A * 10/1950 Goddard ................... F02K 9/64
60/260
2,540,665 A * 2/1951 Goddard ................... F02K 9/64
60/258
(Continued)

FOREIGN PATENT DOCUMENTS

EP  1 144 836 B1  7/2003
GB  1089055 A  11/1967
(Continued)

OTHER PUBLICATIONS

European Search Report issued in European counterpart application No. 18183912.7-1007 dated Jan. 28, 2019 (Seven (7) pages).
(Continued)

*Primary Examiner* — Todd E Manahan
*Assistant Examiner* — Kyle Robert Thomas
(74) *Attorney, Agent, or Firm* — Crowell & Moring LLP (57) ABSTRACT

A combustion chamber structure for a rocket engine includes a hot gas wall (12) that surrounds a combustion chamber (40) and has a plurality of first coolant channels (50) and a plurality of second coolant channels (52). The plurality of first (50) and second (52) coolant channels extend from a first longitudinal end (16) of the hot gas wall (12) to a second longitudinal end (18) of the hot gas wall (12) opposite to the first longitudinal end (16). The combustion chamber structure (10) further comprises a first manifold (20) forming a first coolant chamber (30) and a second manifold (22) forming a second coolant chamber (32) being fluidly separated from the first coolant chamber (30). The first (20) and second (22) manifolds are provided at the first longitudinal end (16) of the hot gas wall (12) and extend in a circumferential direction of the hot gas wall (12). The first coolant chamber (30) is fluidly connected to each of the plurality of first coolant channels (50) and the second coolant chamber (Continued)

(32) is fluidly connected to each of the plurality of second coolant channels (52).

17 Claims, 2 Drawing Sheets

(56) References Cited

U.S. PATENT DOCUMENTS

| | | | |
|---|---|---|---|
| 2,991,617 A | 7/1961 | Nerad et al. | |
| 3,170,286 A * | 2/1965 | Stein | F02K 9/52 60/39.461 |
| 5,233,755 A * | 8/1993 | Vandendriessche | F02K 9/64 29/890.01 |
| 6,640,538 B1 | 11/2003 | Preclik et al. | |
| 6,802,179 B2 * | 10/2004 | Hewitt | F02K 9/972 239/127.1 |
| 6,889,496 B2 * | 5/2005 | Beyer | B23P 15/008 29/890.01 |
| 2004/0168428 A1 * | 9/2004 | Hewitt | F02K 9/972 60/267 |
| 2009/0293448 A1 | 12/2009 | Grote et al. | |

FOREIGN PATENT DOCUMENTS

| | | | |
|---|---|---|---|
| JP | 2011-017322 | * | 1/2011 |
| WO | WO 2010/042095 A2 | | 4/2010 |

OTHER PUBLICATIONS

New Zealand Office Action issued in New Zealand application No. 755150 dated Apr. 14, 2021 (Four (4) pages).

English-language European Office Action issued in European application No. 18 183 912.7-1007 dated Feb. 28, 2022 (Four (4) pages).

* cited by examiner

FIG 1

COMBUSTION CHAMBER STRUCTURE, PARTICULARLY FOR A ROCKET ENGINE

CROSS REFERENCE TO RELATED APPLICATIONS

This application claims priority under 35 U.S.C. § 119 from European Patent Application No. 18183912.7, filed Jul. 17, 2018, the entire disclosure of which is herein expressly incorporated by reference.

BACKGROUND AND SUMMARY OF THE INVENTION

The disclosure relates to a combustion chamber structure, particularly for a rocket engine, and comprises a hot gas wall that surrounds a combustion chamber that has coolant channels extending from a first longitudinal end of the hot gas wall to a second longitudinal end of the hot gas wall opposite to the first longitudinal end. In principle, the combustion chamber structure can be employed not only in the special area of rocket engines, but for other areas as well, such as aircraft construction.

In a combustion chamber structure of a rocket engine, the continuously occurring combustion process results in very high temperatures, typically over 3000° C., and very high pressures, typically of greater than 150 bar. Therefore, a combustion chamber structure must be designed so as to withstand these high temperatures and pressures.

In order to satisfy the requirement for temperature resistance, a combustion chamber structure is usually cooled thereby dissipating the heat generated by the combustion process from the combustion chamber structure. Known cooling methods for cooling a combustion chamber structure are, for example, the radiation cooling, the ablative cooling and the film cooling. Further known is the regenerative cooling, where one of the applied propellants is guided by coolant channels formed on an outer surface of the hot gas surface or within the hot gas wall by coolant channels formed therein. After emerging from the coolant channels, the propellant is fed to the combustion chamber. Manifolds, which distribute the propellant to the coolant channels and collect it again from the coolant channels, are provided. These known methods can be used alone or in combination.

These known cooling methods may require the use of highly expensive materials, for example in the case of radiation cooling, or may lead to loss of power, for example in the case of ablative or film cooling. Further, the regenerative cooling using one of the applied propellants for cooling the combustion chamber structure is often not adapted to sufficiently cool the combustion chamber structure, in particular in the case of combustion chamber structures for engines in thrust classes smaller than 8 kN. Hence, further cooling measures are needed.

The need for sufficiently dissipating the heat generated by the combustion process can be complied with by providing a second type of heat sink, for example by providing two of the above described known cooling methods in specified areas of the combustion chamber structure, respectively. Thereby, the two types of heat sinks can only be alternated in an axial direction of the combustion chamber structure so that only the specified areas of the combustion chamber structure can be cooled by means of one of the heat sinks. Further, the axial alternating provision of the two types of heat sinks results in several cooling gaps, which, for example, lead to the risk of local overheating of the hot gas wall. As a further consequence of the alternating provision of the heat sinks of different types, advantageous characteristics of a specific cooling method can only be applied to the respective specified area or areas of the combustion chamber structure.

A combustion chamber structure is to be provided which satisfies the requirements for temperature resistance while being inexpensive to manufacture and without leading to any serious loss of power of the combustion chamber structure.

A combustion chamber structure with the features of claim 1 is provided.

The disclosed combustion chamber structure comprises a hot gas wall that surrounds a combustion chamber and has a plurality of first coolant channels and a plurality of second coolant channels, wherein the plurality of first and second coolant channels extend from a first longitudinal end of the hot gas wall to a second longitudinal end of the hot gas wall opposite to the first longitudinal end. The disclosed combustion chamber structure further comprises a first manifold forming a first coolant chamber and a second manifold forming a second coolant chamber being fluidly separated from the first coolant chamber, wherein the first and second manifolds are provided at the first longitudinal end of the hot gas wall and extend in a circumferential direction of the hot gas wall. In the disclosed combustion chamber structure, the first coolant chamber is fluidly connected to each of the plurality of first coolant channels and the second coolant chamber is fluidly connected to each of the plurality of second coolant channels.

The disclosed combustion chamber structure comprises two separate cooling circuits for dissipating the heat of the combustion process from the combustion chamber structure. The first cooling circuit comprises the first manifold and the first coolant channels for the first coolant which are fluidly connected to each other, and the second cooling circuit comprises the second manifold and the second coolant channels for the second coolant which are fluidly connected to each other. The first cooling circuit and the second cooling circuit are fluidly isolated from each other. Thus, in the disclosed combustion chamber structure, the generated heat of the combustion process can be spread over the first and second coolants of the two separate cooling circuits thereby using the total mass flow of the two fluidly isolated coolants for dissipating the heat. Thus, since the total mass flow of the two coolants is used, a sufficient cooling of the combustion chamber can be provided also in the case of combustion chamber structures for engines in small thrust classes, for example in thrust classes smaller than 8 kN. Since the first and second coolant channels extend over the whole axial length of the hot gas wall, i.e. from the first longitudinal end to the second longitudinal end, the combustion chamber structure can be sufficiently cooled over its whole axial length, without having any cooling gaps in an axial direction of the combustion chamber structure. Further, no additional cooling methods such as radiation cooling, film cooling and/or ablative cooling are needed, which might lead to high manufacturing costs and/or loss of power.

The first and second manifolds may be embodied as a one-piece part with the hot gas wall. The first and second manifolds may be also embodied as separate parts, which are attached to the hot gas wall by appropriate means, for example by welding them onto the hot gas wall.

The hot gas wall comprises an inner surface that faces the combustion chamber, i.e. contacts the hot gas, and an outer surface that is in contact with the outer environment of the combustion chamber structure. Inside the hot gas wall, the plurality of first and second coolant channels are formed.

The plurality of first and second coolant channels are fluidly isolated from each other. The hot gas wall with the first and second coolant channels may be manufactured as a one-piece part, for example by means of 3D-printing, or may be formed by an inner jacket ("liner") and an outer jacket (jacket) disposed on the outer surface of the inner jacket. In the configuration with the inner jacket and the outer jacket, the first and second coolant channels may be formed on the outer surface of the inner jacket and sealed off by the outer jacket covering the inner jacket. The first and second coolant channels on the outer surface of the inner jacket may be for example formed by milling the inner jacket material.

In one development, the first manifold is configured to distribute a first coolant to the first coolant channels and the second manifold is configured to distribute a second coolant to the second coolant channels, wherein the first coolant is different from the second coolant. The first coolant and the second coolant may, for example, be the two propellants, i.e. the fuel and the oxidizer, and the total mass flow of both the fuel and the oxidizer can be used for absorbing the heat over the whole axial length of the combustion chamber structure.

In another development, the first and second manifolds surround the combustion chamber in the circumferential direction. Thus, the first and second manifolds are provided around the entire circumference of the hot gas wall. The first and second manifolds completely surround the combustion chamber so as to distribute the first coolant and the second coolant to the first coolant channels and the second coolant channels, respectively, which are provided around the entire circumference of the hot gas wall so as to cool the hot gas wall around its entire circumference.

In a further development, the first and second manifolds have a first inlet and a second inlet, respectively, and an inner diameter of the first coolant chamber of the first manifold is decreasing with an increasing distance from the first inlet, and/or an inner diameter of the second coolant chamber of the second manifold is decreasing with an increasing distance from the second inlet. By decreasing the inner diameter of the respective coolant chamber with an increasing distance from the respective inlet, a constant fluid speed at every position of the manifold can be ensured, resulting in an optimized injection geometry. Further, since less material for forming the manifold is needed compared to the case if the respective manifold has a coolant chamber with a constant inner diameter, the respective manifold, and thus also the combustion chamber structure, weighs less.

In another further development, the first manifold is formed outwardly to the second manifold in a radial direction of the combustion chamber structure. Thus, the first manifold protrudes further from the hot gas wall than the second manifold and is thus located further away from the combustion chamber than the second manifold. In this way, the first manifold and the second manifold are provided in a space-saving and compact manner.

In one embodiment, the first and second coolant channels are fluidly connected to the combustion chamber at the second longitudinal end of the hot gas wall. In this way, the first and second coolants can be conveyed as propellants into the combustion chamber. For example, a fuel and an oxidizer are used as first and second coolants, respectively, before being conveyed into the combustion chamber. In this manner, the combustion chamber structure can be exclusively cooled in a regenerative manner.

In a configuration, the first coolant channels open into an additional first coolant chamber at the second longitudinal end of the hot gas wall, and the second coolant channels open into an additional second coolant chamber at the second longitudinal end of the hot gas wall. In the configuration, the first coolant and the second coolant are collected in the respective additional coolant chamber before being conveyed into the combustion chamber.

In a further development of the combustion chamber structure, at the second longitudinal end of the hot gas wall, first exit openings for the first coolant are equidistantly provided in the circumferential direction, and second exit openings for the second coolant are equidistantly provided in the circumferential direction. The first exit openings are fluidly connected to the first coolant channels, and the second exit openings are fluidly connected to the second coolant channels. In this way, both coolants can be led out the coolant channels symmetrically around the circumference. The first coolant and the second coolants may enter the additional first and second coolant chambers via the first and second exit openings. In an embodiment, the first and second coolants are led, preferably via the additional coolant chambers, into an injection head connected to the hot gas wall at its second longitudinal end. Since the first and second coolants are led out into the injection head symmetrically, the geometry in the injection head downstream of the domes can be simplified. For example, no additional manifolds are needed for injecting the first and second coolants into the injection head, thereby reducing weight and complexity of the combustion chamber structure.

In a further development, the first coolant channels and the second coolant channels are so configured and arranged that, at every position of the hot gas wall, an optimum relation between the heat supplied to the hot gas wall by a combustion process in the combustion chamber and the heat dissipated from the hot gas wall by the first and second coolants is achieved, thereby enhancing the performance and power of the combustion chamber structure and decreasing the risk of local overheating.

Thus, the configuration and/or the arrangement of the first and second coolant channels can be adapted to the conditions that are present at the hot gas wall. This may be done by making use of the characteristics inherent to the first and second coolants. For example, the heat capacity, the heat conductivity of the first coolant and the heat resistance of the first and coolant can be different from the heat conductivity of the second coolant and the heat resistance of the second coolant. Hence, for example, the first and second coolant channels can be configured and arranged so that at locations of the hot gas wall with a higher temperature the coolant among the first and second coolants with the higher heat capacity and the higher heat conductivity is guided, provided that it is resistant to these high temperatures.

Hence, in this further development, the arrangement and the configuration of the first and second coolant channels at a location of the hot gas wall are preferably not the same as they are at another location of the hot gas wall. Specifically, the arrangement and the configuration of the first and second coolant channels can be designed at will at every location of the hot gas wall. More specifically, the configuration and the arrangement of the first and second coolant channels can be changed steadily when extending from the first longitudinal end to the second longitudinal end, without the provision of any undesired gaps and/or edges, so that an optimum relation between the heat supplied to the hot gas wall by a combustion process in the combustion chamber and the heat dissipated from the hot gas wall by the first and second coolants can be achieved at every position of the hot gas wall, i.e. both in an axial direction and in a circumferential direction of the hot gas wall.

The configuration and the arrangement can be adapted for each of the first coolant channels and the second coolant channels alone so that an optimum relation between the heat supplied to the hot gas wall by a combustion process in the combustion chamber and the heat dissipated from the hot gas wall by the first and second coolants is achieved, and the configuration and the arrangement can be adapted so that an interaction of the first and second coolant channels results in an optimum relation between the heat supplied to the hot gas wall by a combustion process in the combustion chamber and the heat dissipated from the hot gas wall by the first and second coolants.

In one development, at least one of a distance between the first coolant channels in the circumferential direction of the hot gas wall, a distance between the second coolant channels in the circumferential direction of the hot gas wall, an orientation of the first coolant channels and/or the second coolant channels with respect to an axial direction of the combustion chamber structure, an orientation of the first coolant channels with respect to the second coolant channels, a width dimension of the first coolant channels and/or the second coolant channels, and a distance of the first coolant channels and/or the second coolant channels in a radial direction from the combustion chamber varies at different positions of the hot gas wall. The above characteristics of the first and second coolant channels are preferably so varied that an optimum relation between the heat supplied to the hot gas wall by a combustion process in the combustion chamber and the heat dissipated from the hot gas wall by the first and second coolants is achieved.

By varying the distance between one of the first or second coolant channels in the circumferential direction of the hot gas wall the amount of heat absorbed by the first or second coolant at a specific area of the hot gas wall can be varied. A similar effect can be achieved by varying a width dimension of the first coolant channels and/or the second coolant channels, which in addition also changes the flow velocity of the coolant flowing through the respective coolant channel. By varying an orientation of the first coolant channels and/or the second coolant channels with respect to an axial direction of the combustion chamber structure, it is possible to redistribute heat input inequalities across the hot gas wall to a plurality of coolant channels. Furthermore, for example, by varying a distance of the first coolant channels and/or the second coolant channels in a radial direction from the combustion chamber at different positions of the hot gas wall, it is possible to vary the heat flow from the hot gas wall to the respective coolant. Varying an orientation of the first coolant channels with respect to the second coolant channels may for example encompass varying the distance between the first and second coolant channels, and may encompass that first and second coolant channels that extend in a substantially parallel direction at a first position of the hot gas wall overlap each other at a second position of the hot gas wall. In this way, for example, it is possible to "switch" to the coolant of an adjacent coolant channel when the cooling capacity of the coolant of a coolant channel is depleted, by guiding away the coolant from the combustion chamber so that the guided away cooling channel is located behind the adjacent cooling channel, i.e. radially outwardly from the combustion chamber.

In a further development of the combustion chamber structure, in at least an area of the hot gas wall, a first coolant channel of the plurality of first coolant channels is provided adjacent and with a distance to a second coolant channel of the plurality of second coolant channels in a circumferential direction of the hot gas wall. Thus, it is possible to distribute the heat of a confined area of the heated hot gas wall to both the first coolant and the second coolant and to make thereby use of the characteristics of both the first coolant and the second coolant.

The adjacent first and second coolant channels may run in a direction substantially parallel to an axial direction of the combustion chamber structure when extending from the first longitudinal end to the second longitudinal end, i.e. in a substantially straight line when extending from the first longitudinal end to the second longitudinal end, while following the shape of the hot gas wall in a radial direction of the combustion chamber structure.

In an embodiment of the further development, adjacent first and second coolant channels, in at least an area of the hot gas wall, form an angle with respect to a longitudinal axis of the combustion chamber structure when extending from the first longitudinal end to the second longitudinal end. In this embodiment, the adjacent first and second coolant channels, at least in an area or some areas, do not run in a straight line from the first longitudinal end to the second longitudinal end, but, in addition to the axial extension, they are wound around the longitudinal axis of the combustion chamber structure so as to form an angle with respect to an axial direction of the combustion chamber structure. In this way, heat inequalities across the hot gas wand, i.e. in a circumferential direction of the hot gas wall, can be redistributed to the coolants of a plurality of coolant channels, in particular to both a first coolant and a second coolant.

In the further development, the adjacent first and second channels may have a constant distance to each other when extending from the first longitudinal end to the second longitudinal end. In the further development, the distance of the first cooling channel to the adjacent second cooling channel may also vary when extending from the first longitudinal end to the second longitudinal end. In this manner, the amount of heat absorbed by the first and second coolants at a confined area of the hot gas wall can be varied.

The plurality of first and second coolant channels, in at least an area of the hot gas wall, are alternately provided in a circumferential direction of the hot gas wall. Thus, a first coolant channel is neighboured by two second coolant channels, and vice versa, a second coolant channel is neighboured by two first coolant channels.

In an alternative configuration, it is possible to arrange the coolant channels in a circumferential direction area by area. Thus, an area comprising one or more first cooling channels is followed by an area comprising one or more second coolant channels, which is again followed by an area comprising one or more first cooling channels. For example, two first coolant channels are followed by one second coolant channel, and the one second coolant channel is again followed by two coolant channels. Or, as a further example alternative, two first coolant channels are followed by two second coolant channels, and the two second coolant channels are again followed by two coolant channels. The first coolant may be the fuel and the second coolant may be the oxidant.

In another configuration of the combustion chamber structure, at least one of the plurality of first coolant channels and/or at least one of the plurality of second coolant channels has a varying distance from the combustion chamber in a radial direction when extending in an axial direction from the first longitudinal end to the second longitudinal end. Thus, the first coolant and/or the second coolant is guided away from an inner surface of the hot gas wall or is guided towards an inner surface of the hot gas wall. By varying the distance from the combustion chamber in a radial direction, the amount of heat conveyed from the heated hot gas wall to the coolant in the cooling channel can be varied and can be adapted to the local conditions of the hot gas wall.

In another development, in at least an area of the hot gas wall, the distance of a first or a second coolant channel from the combustion chamber in a radial direction is different from the distance of another first or second coolant channel adjacent to the first or second coolant channel, and the first or second coolant channel is formed to overlap the adjacent first or second coolant channel so that the overlapping coolant channels are provided at the same circumferential position and one of the overlapping coolant channels is provided radially outwardly from the other of the overlapping coolant channels. Thus, with this configuration it is possible to "switch" to the coolant of an adjacent coolant channel when the cooling capacity of the coolant of a coolant channel is depleted, by guiding away the coolant from the combustion chamber so that the guided away cooling channel is located behind the adjacent cooling channel, i.e. radially outwardly from the combustion chamber. The guided away coolant channel may be a first or second coolant channel, and the overlapped coolant channel may be a first or a second coolant channel.

In one development, the combustion chamber structure is configured to be exclusively cooled by the first coolant and the second coolant. Thus, no other cooling methods, such as for example film cooling, ablative cooling or radiation cooling is provided. The combustion chamber structure is exclusively cooled in a regenerative manner. Thus, the combustion chamber structure according to the one development is advantageous in terms of manufacturing costs and loss of power.

Other objects, advantages and novel features of the present invention will become apparent from the following detailed description of one or more preferred embodiments when considered in conjunction with the accompanying drawings.

BRIEF DESCRIPTION OF THE DRAWINGS

Additional advantages, details, and features of the solution described herein will be apparent from the following description of an exemplary embodiment and from the figures, in which.

DETAILED DESCRIPTION OF THE DRAWINGS

Figure 1:
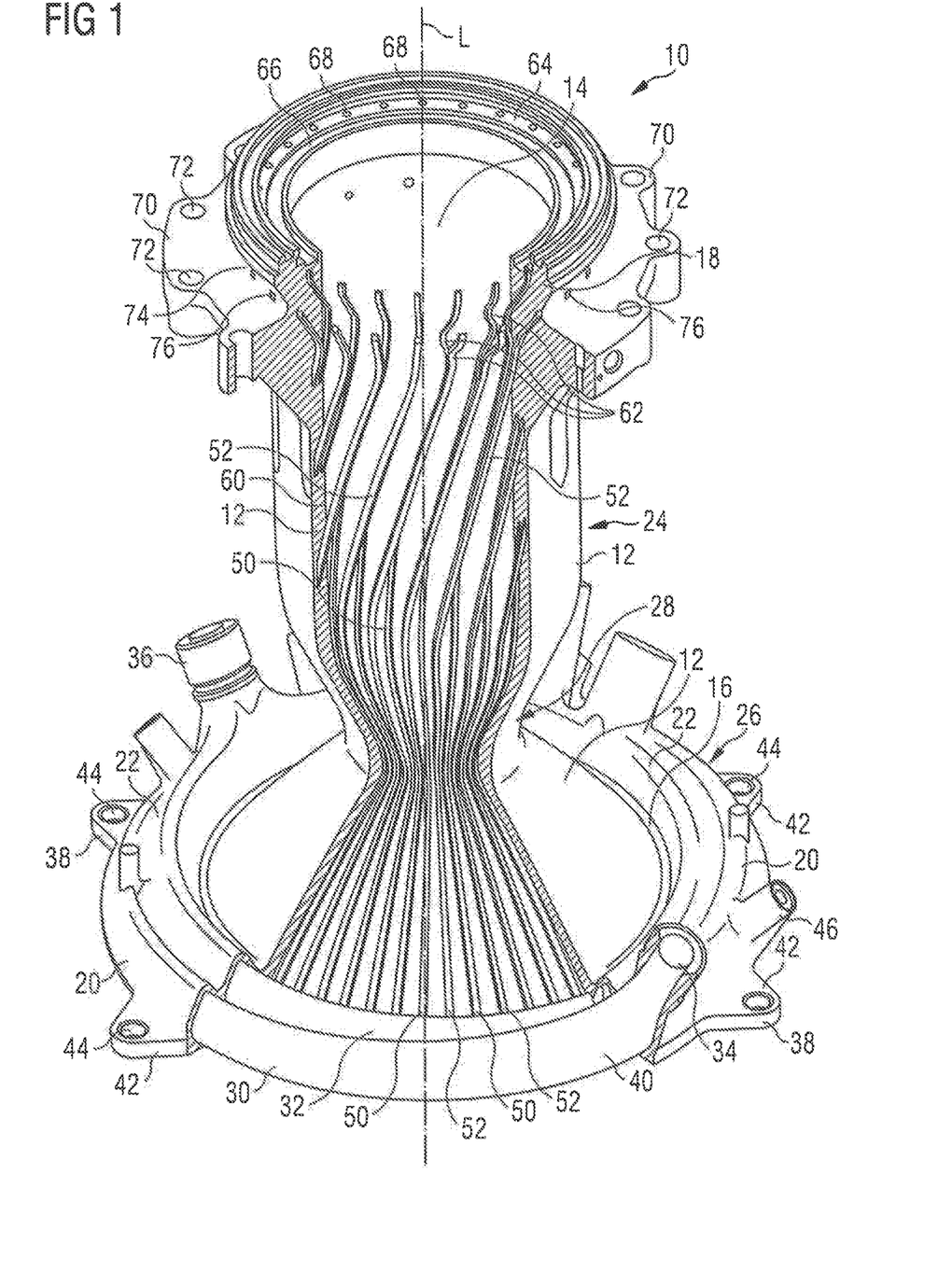
FIG. 1 shows a perspective view of an exemplary embodiment of a combustion chamber structure, wherein a portion of the hot gas wall is illustrated in a longitudinal section along the circumference of the hot gas wall.

The combustion chamber structure 10 shown in FIG. 1 has a hot gas wall 12 which surrounds a combustion chamber 14. The hot gas wall 12 has a first longitudinal end 16, which is a lower longitudinal end with respect to FIG. 1, and a second longitudinal end 18 located at an opposite end of the hot gas wall 12, which is an upper longitudinal end with respect to FIG. 1. Further, the hot gas wall 12 has an inner surface 60, being provided to contact the hot gas in the combustion chamber 14, and an outer surface 61, being provided to contact the outer environment of the combustion chamber structure (see also FIG. 2). At the first, with respect to FIG. 1 lower longitudinal end 16 of the hot gas wall, a first manifold 20 and a second manifold 22 are provided. The first manifold 20 and the second manifold 22 are provided along a whole peripheral edge portion of the hot gas wall 12. The first manifold 20 and the second manifold 22 thus completely surround the combustion chamber 14.

The hot gas wall 12 may be embodied as a one piece-part, or may be formed by several individual parts connected to each other, for example by an outer jacket applied to an inner jacket.

The combustion chamber structure 10 shown in FIG. 1 has a with respect to FIG. 1 upper, first portion 24 that comprises the actual combustion chamber and, adjacent thereto, a with respect to FIG. 1 lower, second portion 26 that comprises a nozzle expansion of an expansion nozzle. A smaller-diameter intermediate portion 28 comprising a nozzle throat is formed between the first portion 24 with the actual combustion chamber and the second portion 26 with the nozzle expansion. In the present disclosure, the entire space surrounded by the hot gas wall 12 is designated as the combustion chamber 14.

In the embodiment shown in FIG. 1, the first manifold 20, the second manifold 22 and the hot gas wall 12 are formed in a one-piece part. However, in other embodiments, the first manifold, the second manifold and the hot gas wall can be embodied as separate parts. In particular, the first manifold and the second manifold may be attached to the hot gas wall, for example by welding them onto the hot gas wall. Also, a half-shell of the respective manifold by may pre-formed at the hot gas wall, and the other half-shell is subsequently attached to the pre-formed half-shell, for example by welding or screwing.

The first manifold 20 forms a first coolant chamber 30 surrounding the combustion chamber 14 and the second manifold 22 forms a second coolant chamber 32 surrounding the combustion chamber 14. The first coolant chamber 30 is provided for receiving a first coolant and the second coolant chamber 32 is provided for receiving a second coolant. For that purpose, the first manifold 20 comprises a first inlet port 34 and the second manifold 22 comprises a second inlet port 36. In the exemplary embodiment, an inner diameter of the first coolant chamber 30 of the first manifold 20 is decreasing with an increasing distance from the first inlet port 34, and an inner diameter of the second coolant chamber 32 of the second manifold 22 is decreasing with an increasing distance from the second inlet port 36.

As can be also seen in FIG. 1, the first manifold 20 is located further away from the combustion chamber 14 than the second manifold 22. Thus, the first manifold 20 is located radially outwardly with respect to the second manifold 22. Further, the first manifold 22 comprises attachment means 38 for attaching the combustion chamber structure 10 to an adjacent component. In particular, the attachment means 38 may be provided for attaching the combustion chamber structure 10 to an expansion nozzle or to a part of an expansion nozzle. In the illustrated exemplary embodiment, the attachment means 38 is provided at an outer peripheral edge 40 of the first manifold 20 and is embodied as a plurality of attachment structures 42 provided in a circumferential direction which each comprise an attachment hole 44. The attachment holes 44 are for receiving a screw by means of which the combustion chamber structure 10 can be attached to the adjacent component. The adjacent component may be an extension part of the nozzle expansion of the expansion nozzle. In this case, the second portion 26 may be a part of a nozzle expansion of the expansion nozzle.

The first manifold 20 further comprises a sensor port 46 for connecting a sensor to the first manifold 20, i.e. to the combustion chamber structure. Examples of sensors that may be attached are sensors for dynamic pressure measurement, static pressure measurement and intrusive temperature measurement. The second manifold 22 may also comprise one or more sensor ports for connecting one or more sensors, which are not illustrated in FIG. 1.

The hot gas wall 12 further comprises a plurality of coolant channels 50, 52. The plurality of coolant channels 50, 52 are formed inside the hot gas wall 12 as cavities that extend from the first longitudinal end 16 to the second longitudinal end 18. The plurality of coolant channels 50, 52 are part of two cooling circuits that are fluidly separated from each other. In particular, a first cooling circuit comprises the first manifold 20 and a plurality of first coolant channels 50, and the second cooling circuit comprises the second manifold 22 and a plurality of second coolant channels 52. The first manifold 20 is fluidly connected to each of the first coolant channels 50 for distributing the first coolant to each of the first coolant channels 50 and the second manifold 22 is fluidly connected to each of the second coolant channels 52 for distributing the second coolant to each of the second coolant channels 52. Thus, the first coolant channels 50 and the second coolant channels 52 are also fluidly isolated from each other.

Figure 2:
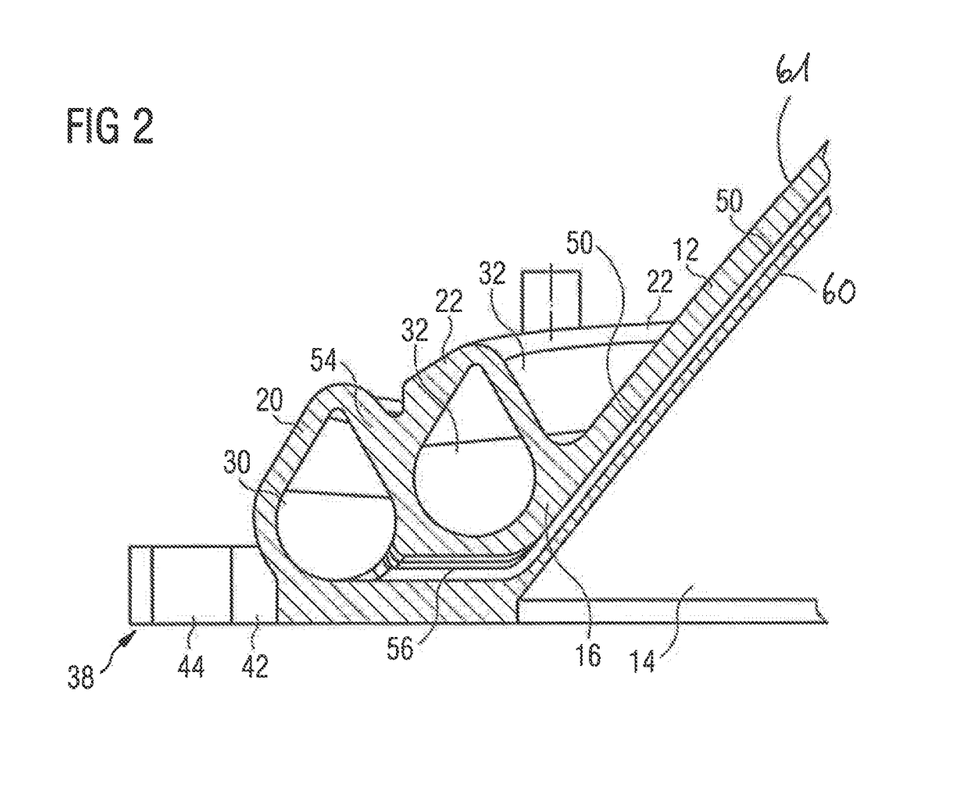
FIG. 2 shows a sectional view of a lower region of the combustion chamber structure of FIG. 1.

The configuration of the first and second manifolds 20, 22 and their connection to the first and second coolant channels 50, 52, respectively, will be explained in more detail by reference to FIG. 2. FIG. 2 is a longitudinal section through the first and second manifolds 20, 22 and a region of the hot gas wall 12 adjoining the first and second manifolds 20, 22, in a radial direction of the combustion chamber structure 10. As is illustrated in FIG. 2, in the exemplary embodiment, the hot gas wall 12 comprises at the first, lower longitudinal end 16 a circumferential torus-like bulge 54 in the interior of which the first coolant chamber 30 of the first manifold 20 and the second coolant chamber 32 of the second manifold 22 are formed. Further, in the longitudinal section of FIG. 2, a passage 56 is illustrated by means of which the first manifold 20 is fluidly connected to one of the first coolant channels 50. The passage 56 is formed in a bottom part of the torus-like bulge 54. A corresponding passage is formed in the bottom part of the torus-like bulge 54 for fluidly connecting the second coolant chamber 32 with a second coolant channel 52 adjacent to the illustrated first coolant channel 50. The corresponding passage cannot be seen in the longitudinal section of FIG. 2, since it is circumferentially offset with respect to the illustrated passage 56. In this manner, each of the first coolant channels 50 and each of the second coolant channels 52 are fluidly connected to the first manifold 20 and the second manifold 22, respectively, by means of corresponding passages 56 being formed in the torus-like bulge 54 spaced from one another in the circumferential direction.

With reference to FIG. 1 again, the course of the coolant channels 50, 52 from the first longitudinal end 16 to the second longitudinal end 18 of the hot gas wall 12 and the arrangement of the coolant channels 50, 52 with respect to each other are not uniform across the entire hot gas wall 12. In particular, the first coolant channels 50 and the second coolant channels 52 are so configured and arranged that, at every position of the hot gas wall 12, an optimum relation between the heat supplied to the hot gas wall 12 by a combustion process in the combustion chamber 14 and the heat dissipated from the hot gas wall 12 by the first and second coolants 50, 52 is achieved.

In the exemplary embodiment of FIG. 1, the first and second coolant channels 50, 52 are alternately formed in the hot gas wall 12 of the lower, second portion 26 of the combustion chamber structure 10. Thus, a first coolant channel 50 is neighboured by two second coolant channels 52, and a second coolant channel 52 is neighboured by two first coolant channels 50. In the hot gas wall 12 of the second, lower portion 26, adjacent first and second coolant channels 50, 52 are arranged with a distance to each other in the circumferential direction of the hot gas wall 12. The first and second coolant channels 50, 52 are equidistantly provided around a longitudinal axis L of the combustion chamber structure 10. However, when viewed along a direction from the first longitudinal end 16 of the hot gas wall 12 to the intermediate portion 28 of the hot gas wall 12 forming the nozzle throat, the distance between adjacent first and second coolant channels 50, 52 decreases. More specifically, the distance between adjacent first and second coolant channels 50, 52 continuously decreases.

Furthermore, in the hot gas wall 12 of the second, lower portion 26, the first and second coolant channels 50, 52 extend in a direction substantially parallel to an axial direction of the combustion chamber structure 10 when extending from the first longitudinal end 16 to the second longitudinal end 18, i.e. in a substantially straight line when extending from the first longitudinal end 16 to the second longitudinal end 18 while following the shape of the hot gas wall 12 in a radial direction of the combustion chamber structure 10. Thus, the course of the first and second coolant channels 50, 52 is substantially parallel to the longitudinal axis L when projected onto a longitudinal plane (i.e. a plane containing the longitudinal axis L).

By contrast, in the hot gas wall 12 of the first, upper portion 24 of the combustion chamber structure 10, the first and second coolant channels 50, 52 form an angle (which is greater than 0°) with respect to the longitudinal axis L of the combustion chamber structure 10 when extending from the intermediate portion 28 to the second longitudinal end 18. Thus, the first and second coolant channels 50, 52 do not run in a straight line parallel to the longitudinal axis L (when projected onto the longitudinal plane), but, in addition to the extension in an axial direction, they are wound around the longitudinal axis L of the combustion chamber structure 10 so as to form an angle with respect to the longitudinal axis L of the combustion chamber structure 10. In this way, heat inequalities across the hot gas wand 12, i.e. in a circumferential direction of the hot gas wall 12, can be redistributed to the coolants of a plurality of coolant channels 50, 52, in particular to both a first coolant and a second coolant.

Further, in the exemplary embodiment of FIG. 1, the first and second coolant channels 50, 52 are not wound around the longitudinal axis L to the same extent, but the second coolant channels 52 are wound around the longitudinal axis L to a greater extent. In the region of the hot gas wall 12 forming the first, upper portion 24, the second coolant channels 52 thereby overlap the first coolant channels 50. In the overlapping region, an overlapping second coolant channel 52 is provided at the same circumferential position as the overlapped first coolant channel 50. In a radial direction, the overlapping second coolant channel 52 is located further outwardly than the overlapped first coolant channel 50. Hence, the overlapping second coolant channel 52 is located further away from the combustion chamber 14 or from the inner surface 60 of the hot gas wall 12. Thus, for being able to overlap the adjacent first coolant channels 50, the second coolant channels 52, when extending in a direction to the second longitudinal end 18, are formed or provided in the hot gas wall 12 so as to continuously increase their distance to the combustion chamber 14 or to the inner surface 60 of the hot gas wall 12. The first coolant channels 50, when extending in a direction to the second longitudinal end 18, are formed or provided in the hot gas wall 12 so as to have a constant distance to the combustion chamber 14 or to the inner surface 60 of the hot gas wall 12 or so as to continuously decrease their distance to the combustion chamber 14 or to the inner surface 60 of the hot gas wall 12.

By means of the overlapping, it is possible to "switch" to the first coolant of an adjacent first coolant channel 50 when the cooling capacity of the second coolant of the second coolant channel 52 is depleted, by guiding away the second coolant channel 52 from the combustion chamber 14 so that the guided away second coolant channel 52 is located behind the adjacent first coolant channel 50, i.e. radially outwardly from the combustion chamber 14.

In the region of the hot gas wall 12 forming the first, upper portion 24 and having a substantially constant outer diameter, the first coolant channels 50 are equidistantly arranged, and the second coolant channels 52 are equidistantly arranged. In contrast, the distance between adjacent first and second coolant channels 50, 52 decreases in a direction towards the second longitudinal end 16 as far as adjacent first and second coolant channels 50, 52 overlap each other, as described above.

As can be further seen in FIG. 1, the regular course of some of the first and/or second coolant channels 50, 52 is interrupted at some predetermined locations, where the some of the first and/or second coolant channels 50, 52 form convex portions 62. The convex portions 62 are formed to run around components that are positioned at these predetermined locations of the combustion chamber structure 10. The components may be, for example, sensor components or igniter components. In this way, it is possible to place the specific components at positions of the combustion chamber structure that are optimal for the specific components without leading to a cooling interruption at these predetermined locations.

At the second, upper longitudinal end 18, the hot gas wall 12 forms an additional first coolant chamber 64 that extends in the circumferential direction of the hot gas wall 12. The additional first coolant chamber 64 is embodied by an annular groove 66 formed in the hot gas wall 12. The annular groove 66 is immediately adjacent to the interior space surrounded by the hot gas wall 12. The first coolant channels 50 open into the additional first coolant chamber 64 at the second, upper longitudinal end 18 via first exit openings 68 provided in the annular groove 66.

The further walls confining the additional first coolant chamber 64, which are not illustrated in FIG. 1, can be provided by an injection head that can be attached to the combustion chamber structure 10 at its second, upper longitudinal end. The first coolant can be introduced into the combustion chamber 14 by means of the injection head. In particular, the first coolant is conveyed from the first coolant channels 50 via the first exit openings 68 into the additional first coolant chamber 64 and further into the injection head, for example by means of radial bores. From the injection head, the first coolant is further conveyed into the combustion chamber 14. Thus, in the exemplary embodiment, the additional first coolant chamber 64 functions both as a collection chamber and as a distribution chamber. It therefore has a smaller volume than the first and second coolant chambers 30, 32, which function as distribution chambers.

For attaching the injection head to the combustion chamber structure 10, the combustion chamber structure 10 comprises at the second, upper longitudinal end 18 an attachment flange 70 or a plurality of attachment flanges 70 with attachment holes 72 provided therein.

The second coolant channels 32 exit from the hot gas wall 12 at a lateral peripheral face 74 of the hot gas wall 12 via second exit openings 76. The second coolant channels 52 open at the lateral peripheral face 74 into an additional second coolant chamber. The additional second coolant chamber is not illustrated in FIG. 1. It may be formed by a wall that is formed by the later peripheral face 74 and a manifold ring. The manifold ring may be part of the combustion chamber structure, the injection head or may be also formed by a cavity formed by attaching the injection head to the combustion chamber structure. From the additional second coolant chamber, the second coolant may be directly injected into the injection head, for example via radial bores, or it may be collected and guided to the outside of the combustion chamber structure, before it is returned into the injection head, for example by means of pipes or tubes.

If the first and second coolants are directly guided into the injection head via radial bores, the respective radial bores for the first and second coolants may be offset in an axial direction (i.e. they are provided at different heights in an axial direction), or they are alternately provided in a circumferential direction of the injection head and/or the combustion chamber at the same height in an axial direction. If the respective radial bores are provided at different heights, also the first and second coolant chambers may be provided at different heights in an axial direction.

Both the exit openings 68 of the first coolant into the additional first coolant chamber 64 and the exit openings 76 of the second coolant into the additional second coolant chamber are equally spaced in a circumferential direction of the combustion chamber structure 10. In this way, since both coolants can be led out the coolant channels 50, 52 symmetrically around the circumference into the first and second coolant chambers and from there into the injection head, for example by means of radial bores provided at different heights in an axial direction of the combustion chamber structure and provided regularly in a circumferential direction thereof, the geometry can be simplified. For example, since the first and second coolants 50, 52 are led out symmetrically into the injection head, the need for a greater volume (e.g. by means of the so-called "dome") can be dispensed with, resulting in a reduced weight and complexity.

In the disclosed combustion chamber structure, the full mass flow of both the first coolant and the second coolant can be made use of for cooling the combustion chamber structure 14, which results in an enhanced cooling performance. The first coolant and the second coolant may be two propellants, such as the fuel and the oxidizer, and the full mass flow of the first and second coolants may be conveyed to the combustion chamber. Thus, the combustion chamber structure can be sufficiently cooled, also in the case of combustion chamber structures for engines in small thrust classes, without the provision of any further heat sinks which would lead to loss of power, such as in the case of film cooling which leads to a reduced combustion efficiency.

The first and second coolant channels 50, 52 may be configured such that the mass flow of the coolants is constant over the whole axial length of the combustion chamber structure, also resulting in a better cooling performance.

In the disclosed combustion chamber structure 10, the first and second coolant channels 50, 52 may be arranged and configured such that, at every position of the hot gas wall 12, i.e. both in an axial direction and in a circumferential direction, an optimum relation between the heat supplied to the hot gas wall 12 by a combustion process in the combustion chamber 14 and the heat dissipated from the hot gas wall 12 by the first and second coolants is achieved. In order to achieve this, for example, the course and/or the geometry of the first and/or second coolant channels 50, 52 may be continuously changed in any desired manner, and/or the hot gas wall thickness may be continuously changed. The disclosed combustion chamber 10 eliminates the need to provide any further cooling methods, i.e. it may be exclusively cooled in a regenerative manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combustion chamber structure for a rocket engine, the combustion chamber structure comprising:
    a hot gas wall that surrounds a combustion chamber and has a plurality of first coolant channels and a plurality of second coolant channels, the plurality of first and second coolant channels extending from a first longitudinal end of the hot gas wall to a second longitudinal end of the hot gas wall opposite to the first longitudinal end,
    a first manifold forming a first coolant chamber and a second manifold forming a second coolant chamber being fluidly separated from the first coolant chamber, the first and second manifolds being provided at the first longitudinal end of the hot gas wall and extending in a circumferential direction of the hot gas wall,
    wherein the first coolant chamber is fluidly connected to each of the plurality of first coolant channels,
    wherein the second coolant chamber is fluidly connected to each of the plurality of second coolant channels,
    wherein in at least an area of the hot gas wall, a first coolant channel of the plurality of first coolant channels is provided adjacent and with a distance to a second coolant channel of the plurality of second coolant channels in a circumferential direction of the hot gas wall,
    wherein a course of the adjacent first and second coolant channels is substantially parallel to a longitudinal axis of the combustion chamber structure when projected onto a longitudinal plane containing the longitudinal axis,
    wherein in at least an area of the hot gas wall, the adjacent first and second coolant channels do not run in a straight line parallel to the longitudinal axis when projected onto the longitudinal plane, so that the adjacent first and second coolant channels form an angle with respect to the longitudinal axis whereby such angle the adjacent first and second coolant channels wind around the longitudinal axis, and
    wherein an orientation of the first coolant channels with respect to the second coolant channels varies at different positions of the hot gas wall.

2. The combustion chamber structure of claim 1, wherein the first manifold is configured to distribute a first coolant to the first coolant channels and the second manifold is configured to distribute a second coolant to the second coolant channels, the first coolant being different from the second coolant.

3. The combustion chamber structure of claim 1, wherein the first and second manifolds surround the combustion chamber in the circumferential direction.

4. The combustion chamber structure of claim 1, wherein the first and second manifolds have a first inlet and a second inlet, respectively, and an inner diameter of the first coolant chamber of the first manifold is decreasing with an increasing distance from the first inlet, and/or an inner diameter of the second coolant chamber of the second manifold is decreasing with an increasing distance from the second inlet.

5. The combustion chamber structure of claim 1, wherein the first manifold is formed outwardly to the second manifold in a radial direction of the combustion chamber structure.

6. The combustion chamber structure of claim 1, wherein the first and second coolant channels are fluidly connected to the combustion chamber at the second longitudinal end of the hot gas wall.

7. The combustion chamber structure of claim 1, wherein the first coolant channels open into an additional first coolant chamber at the second longitudinal end of the hot gas wall, and the second coolant channels open into an additional second coolant chamber at the second longitudinal end of the hot gas wall.

8. The combustion chamber structure of claim 1, wherein, at the second longitudinal end of the hot gas wall, first exit openings for the first coolant are equidistantly provided in the circumferential direction, and second exit openings for the second coolant are equidistantly provided in the circumferential direction.

9. The combustion chamber structure of claim 1, wherein a hot gas wall thickness and/or at least one of: a course and a geometry, of the first and/or second coolant channels continuously changes along both an axial and circumferential direction of the hot gas wall in such a manner that the first coolant channels and the second coolant channels are so configured and arranged that, at every position of the hot gas wall, a given relation between the heat supplied to the hot gas wall by a combustion process in the combustion chamber and the heat dissipated from the hot gas wall by the first and second coolants is achieved.

10. The combustion chamber structure of claim 9, wherein one or more of a distance between the first coolant channels in the circumferential direction of the hot gas wall, a distance between the second coolant channels in the circumferential direction of the hot gas wall, an orientation of the first coolant channels and/or the second coolant channels with respect to the axial direction of the combustion chamber structure, a width dimension of the first coolant channels and/or the second coolant channels, and a distance of the first coolant channels and/or the second coolant channels in a radial direction from the combustion chamber varies at different positions of the hot gas wall.

11. The combustion chamber structure of claim 1, wherein the distance to the second coolant channel varies when extending in an axial direction from the first longitudinal end to the second longitudinal end.

12. The combustion chamber structure of claim 1, wherein, in at least an area of the hot gas wall, the plurality of first and second coolant channels are alternately provided in a circumferential direction of the hot gas wall.

13. The combustion chamber structure of claim 1, wherein at least one of the plurality of first coolant channels and/or at least one of the plurality of second coolant channels has a varying distance from the combustion chamber in a radial direction thereof when extending from the first longitudinal end to the second longitudinal end.

14. The combustion chamber structure of claim 1, wherein, in at least an area of the hot gas wall, the distance of a first or a second coolant channel from the combustion chamber in a radial direction is different from the distance of another first or second coolant channel adjacent to the first or second coolant channel, and the first or second coolant channel is formed to overlap the other adjacent first or second coolant channel so that overlapping coolant channels are provided at the same circumferential position and one of the overlapping coolant channels is provided radially outwardly from the other of the overlapping coolant channels.

15. The combustion chamber structure of claim 1, wherein the combustion chamber structure is configured to be exclusively cooled by the first coolant and the second coolant.

16. The combustion chamber structure of claim 1, wherein one or more of a distance between the first coolant channels in the circumferential direction of the hot gas wall, a distance between the second coolant channels in the circumferential direction of the hot gas wall, an orientation of the first coolant channels and/or the second coolant channels with respect to an axial direction of the combustion chamber structure, a width dimension of the first coolant channels and/or the second coolant channels, and a distance of the first coolant channels and/or the second coolant channels in a radial direction from the combustion chamber varies at different positions of the hot gas wall.

17. A combustion chamber structure, particularly for a rocket engine, comprising:
   a hot gas wall that surrounds a combustion chamber and has a plurality of first coolant channels and a plurality of second coolant channels, the plurality of first and second coolant channels extending from a first longitudinal end of the hot gas wall to a second longitudinal end of the hot gas wall opposite to the first longitudinal end,
   a first manifold forming a first coolant chamber and a second manifold forming a second coolant chamber being fluidly separated from the first coolant chamber, the first and second manifolds being provided at the first longitudinal end of the hot gas wall and extending in a circumferential direction of the hot gas wall,
   wherein the first coolant chamber is fluidly connected to each of the plurality of first coolant channels,
   wherein the second coolant chamber is fluidly connected to each of the plurality of second coolant channels,
   wherein in at least an area of the hot gas wall, a first coolant channel of the plurality of first coolant channels is provided adjacent and with a distance to a second coolant channel of the plurality of second coolant channels in a circumferential direction of the hot gas wall,
   wherein a course of the adjacent first and second coolant channels is substantially parallel to a longitudinal axis of the combustion chamber structure when projected onto a longitudinal plane containing the longitudinal axis, and
   wherein in at least an area of the hot gas wall, the adjacent first and second coolant channels do not run in a straight line parallel to the longitudinal axis when projected onto the longitudinal plane, so that the adjacent first and second coolant channels form an angle with respect to the longitudinal axis whereby such angle the adjacent first and second coolant channels wind around the longitudinal axis, the second coolant channels being wound around the longitudinal axis to a greater extent than the first coolant channels.

* * * * *